Figure 1:
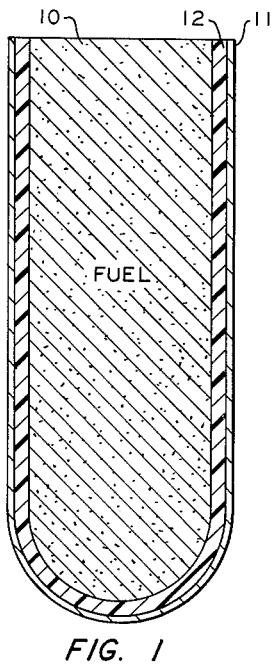

Oct. 19, 1965   R. L. COBB   3,213,173
METHOD OF POTTING AND BONDING
Filed March 17, 1958

INVENTOR.
R. L. COBB
BY Hudson and Young
ATTORNEYS

United States Patent Office 3,213,173
Patented Oct. 19, 1965

3,213,173
METHOD OF POTTING AND BONDING
Raymond L. Cobb, Bartlesville, Okla., assignor to Phillips Petroleum Company, a corporation of Delaware
Filed Mar. 17, 1958, Ser. No. 722,101
5 Claims. (Cl. 264—272)

In one aspect this invention relates to a method utilizing potting and bonding compositions. In another aspect this invention relates to potting and bonding compositions prepared by blending polyurethane monomers with an N-vinyl amide to form a fluid blend which cures to a solid product. In another aspect this invention relates to potting and bonding compositions having good bonding qualities, high tensile and high tear strength. In another aspect this invention relates to the use of said potting and bonding compositions as the binder component in a solid propellant composition.

Potting and bonding compositions of many types and having many uses are well known in the art. However, there is a continuous search for new potting and bonding compositions having particular properties or uses which are lower in cost, which are more easily prepared, or which are otherwise competitive with known materials.

When preparing polyurethane compositions, a polyhydroxy compound is blended with a polyisocyanate and a plasticizer and the resulting fluid blend is cured to form a solid product. Liquid compositions of this type are suitable as potting compounds and for the fabrication of various objects, e.g., they are valuable for use as the binder component in castable propellants. One of the difficulties involved in preparing these compositions is that the commercial plasticizers employed, i.e., materials such as dioctyl sebacate, dioctyl phthalate, and the like, when used in the necessary quantities, are frequently not compatible with said polyurethane compositions and have a tendency to bleed therefrom. It has now been found that this difficulty can be alleviated if N-vinyl amides of the type hereinafter described are employed as plasticizers.

In the production of casting compositions, it is highly desirable that they remain in the fluid state for a sufficient time to allow for the necessary processing operations, i.e., the pot life should not be too short. When commercial plasticizers are used, the compositions frequently have a very short pot life, thus making processing operations difficult. It has now been found that N-vinyl amides are not only compatible plasticizers for polyurethane compositions but they also very markedly increase the pot life of such compositions and thereby facilitate the fabrication of many types of articles.

The N-vinyl amides not only serve to increase the pot life of the polyurethane compositions and function as compatible plasticizers, but in addition the solid products in which they are present have better tensile strength and tear strength than corresponding compositions in which commercial plasticizers are employed.

Thus, broadly speaking, in one aspect the present invention comprises a method utilizing potting and bonding composition comprising a polyurethane composition together with an N-vinyl amide as a plasticizer therefor.

Figure 2A:
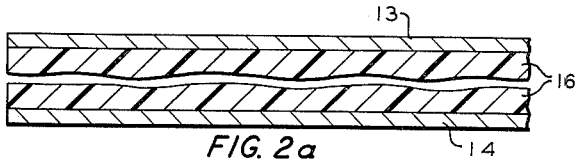
Figure 2D:
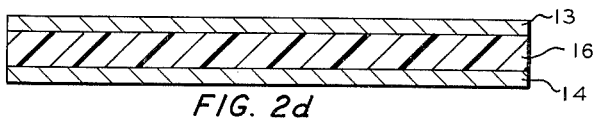
Figure 4:
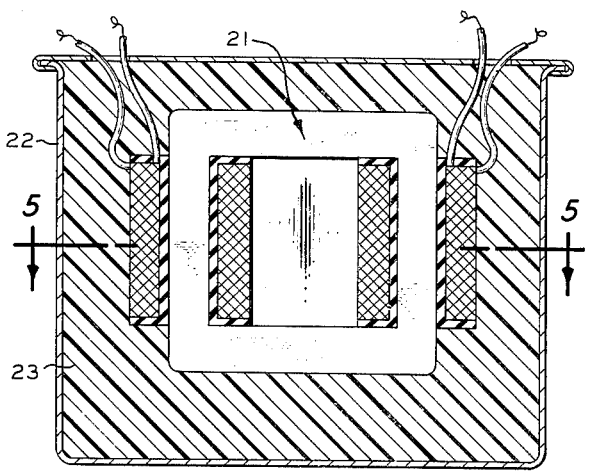
Figure 3:
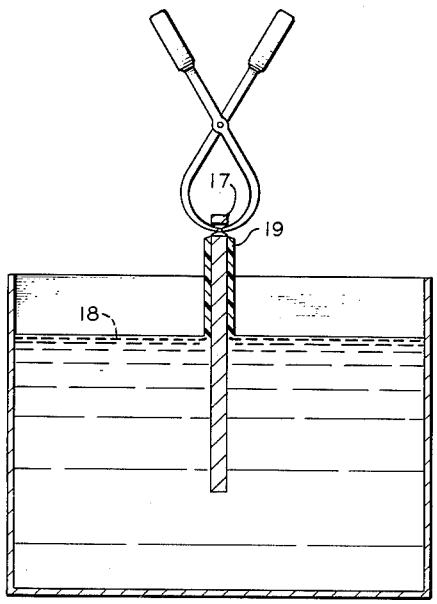
Figure 5:
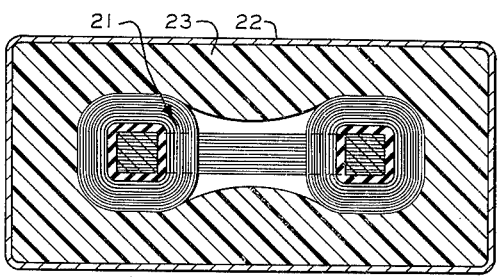

The potting and bonding compositions of the invention are applicable for manufacturing assemblies in which the components are made from various types of materials such as metal, rubber, and plastics. They are particularly applicable for use in electrical equipment such as transformers, coils and the like; as a liner material for bonding a solid propellant charge to the metal casing or motor chamber, potting of electronic assemblies, as components in laminated structures, for sealing pipes, as putty, coating for metals, etc. Some of these uses are illustrated in the drawings of which:

FIGURE 1 is a cross sectional view of a metal casing having a solid propellant sealed thereto by the use of a composition of the invention,
FIGURE 2a shows two solid components coated with a composition of the invention prior to bonding,
FIGURE 2b shows the assembled components of FIGURE 2a,
FIGURE 3 illustrates the dipping of a solid into a liquid composition of the invention and the liquid material adhering to said solid,
FIGURE 4 is a cross sectional view of a transformer potted in a metal case illustrating the use of a composition of the invention as a potting compound for electrical equipment, and
FIGURE 5 is a top sectional view of FIGURE 4 taken along the lines 5—5.

An object of this invention is to provide a new potting and bonding composition. Another object of this invention is to provide a liquid or semi-liquid composition of matter which upon curing sets to a firm product having good bonding qualities, higher tensile and higher tear strength. Still another object of this invention is to provide a method of producing a novel potting composition prepared by blending polyurethane monomers and an N-vinyl amide. A further object of this invention is to provide a method of using the improved potting and bonding compositions of the invention. Still another object of this invention is to provide an improved solid propellant wherein the binder component comprises polyurethane monomers blended with an N-vinyl amide. Other aspects, objects and advantages of the invention will be apparent to those skilled in the art in view of this disclosure.

Thus, according to the invention there is provided a liquid potting and bonding composition comprising: an active hydrogen-containing compound selected from the group consisting of aliphatic saturated and unsaturated polyhydroxy compounds and polyamino compounds containing at least two active hydrogen atoms; a polyisocyanate which will react with said active hydrogen-containing compound; and from 1 to 15 weight percent of an N-vinyl amide characterized by a structural formula selected from the group of formulae consisting of

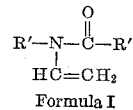

Formula I and

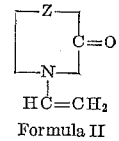

Formula II wherein: each R′ is selected from the group consisting of alkyl, cycloalkyl, aryl, alkaryl, and aralkyl hydrocarbon groups containing from 1 to 16 carbon atoms; Z is selected from the group consisting of saturated, monoolefinic, and diolefinic divalent hydrocarbon radicals containing from 3 to 17 carbon atoms and which, together with the N atom and the C atom connected thereto, form a 5 to 7 membered ring; and wherein the total number of carbon atoms in the molecule does not exceed 20.

The saturated, monoolefinic, and diolefinic divalent hydrocarbon radicals of Formula II above are selected from the group consisting of

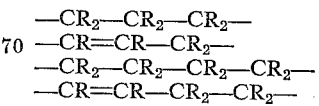

—CR=CR—CR=CR—
—CR$_2$—CR$_2$—CR$_2$—CR$_2$—CR$_2$—
—CR=CR—CR$_2$—CR$_2$—CR$_2$—
—CR=CR—CR$_2$=CR—CR$_2$—
—CR$_2$—CR=CR—CR$_2$—CR$_2$— radicals wherein each R is selected from the group consisting of hydrogen and alkyl, cycloalkyl, aryl, alkaryl, and aralkyl hydrocarbon radicals containing from 1 to 14 carbon atoms.

The amount of N-vinyl amide employed will depend, at least in part, upon the active hydrogen containing compound used in the composition. It will generally be in the range between one and 15 weight percent, preferably between 2 and 10 weight percent, based on the total composition. Excessive quantities of the N-vinyl amides are to be avoided as in such cases the compositions may not give solid products when cured, or if solid products are obtained, they will not have the desired properties.

Any suitable N-vinyl amide which is liquid under the conditions of use, i.e., liquid at temperatures of about 70 to about 200° F. which are the temperatures normally employed in mixing the ingredients of the potting and bonding compositions of the invention, can be used as a plasticizer in the practice of the invention.

One presently preferred group of the plasticizers of the invention is the acyclic N-vinyl amides represented by Formula I given above. Examples of said acyclic N-vinyl amides include, among others, the following:

N-vinylacetanilide,
N-ethyl-N-vinylacetamide,
N-butyl-N-vinylpropionamide,
N-methyl-N-vinylbutyramide,
N-heptyl-N-vinylcapramide,
N-octyl-N-vinylcapramide,
N-decyl-N-vinylcaprylamide,
N-dodecyl-N-vinylcaprylamide,
N-benzyl-N-vinylpropionamide,
N-p-tolyl-N-vinylbutyramide, and
N-cyclohexyl-N-vinylisobutyramide.

A presently more preferred group of the plasticizers of the invention are the cyclic N-vinyl amides represented by Formula II given above. Examples of said cyclic N-vinyl amides include, among others, the following:

the N-vinyl-2-pyrrolones such as N-vinyl-Δ$^4$-2-pyrrolone,
N-vinyl-Δ$^3$-2-pyrrolone,
N-vinyl-3-methyl-Δ$^4$-2-pyrrolone,
N-vinyl-5-isopropyl-Δ$^4$-2-pyrrolone,
N-vinyl-4-tetradecyl-Δ$^4$-2-pyrrolone,
N-vinyl-3-benzyl-Δ$^4$-2-pyrrolone,
N-vinyl-4-cyclopentyl-Δ$^3$-2-pyrrolone,
N-vinyl-3-(2,4-dimethylphenyl)-Δ$^3$-2-pyrrolone, and
N-vinyl-3,4,5-tri-n-butyl-Δ$^3$-2-pyrrolone;
the N-vinyl-2-pyrrolidones such as N-vinyl-2-pyrrolidone,
N-vinyl-4-methyl-2-pyrrolidone,
N-vinyl-3-phenyl-2-pyrrolidone, and
N-vinyl-3-cyclohexyl-2-pyrrolidone;
the N-vinyl-2-pyridones such as N-vinyl-2-pyridone,
N-vinyl-4-ethyl-2-pyridone,
N-vinyl-5-benzyl-2-pyridone,
N-vinyl-4-ethyl-5-propyl-2-pyridone,
N-vinyl-4-(4-tolyl)-5-hexyl-2-pyridone, and
N-vinyl-5-butyl-6-ethyl-2-pyridone;
the N-vinyldihydro-2-pyridones such as
N-vinyl-3,6-dihydro-2-pyridone,
N-vinyl-5,6-dihydro-2-pyridone,
N-vinyl-3,4-dihydro-2-pyridone,
N-vinyl-3,6-dimethyl-3,6-dihydro-2-pyridone,
N-vinyl-4-ethyl-5,6-dihydro-2-pyridone,
N-vinyl-6-heptyl-3,4-dihydro-2-pyridone, and
N-vinyl-3,4-dihexyl-3,4-dihydro-2-pyridone;
the N-vinyl-2-piperidones such as N-vinyl-2-piperidone,
N-vinyl-3-methyl-2-piperidone,
N-vinyl-3,5,6-triethyl-4-(4-tolyl)-2-piperidone, and
N-vinyl-3,4,5-trimethyl-2-piperidone;
the N-vinyl-2-oxo-hexamethyleneimines such as
N-vinyl-2-oxo-hexamethyleneimine
 (N-vinylcaprolactam),
N-vinyl-2-oxo-3-methylhexamethyleneimine,
N-vinyl-2-oxo-4,5,6-triethylhexamethyleneimine,
N-vinyl-2-oxo-6-phenylhexamethyleneimine, and
N-vinyl-2-oxo-5-cyclohexylhexamethyleneimine;
the N-vinyl-2-oxo-hexenyleneimines such as
N-vinyl-2-oxo-6-hexenyleneimine,
N-vinyl-2-oxo-5-hexenyleneimine,
N-vinyl-2-oxo-4-hexenyleneimine,
N-vinyl-2-oxo-3-hexenyleneimine,
N-vinyl-2-oxo-6-ethyl-3-hexenyleneimine,
N-vinyl-2-oxo-3-cyclohexyl-4-hexenyleneimine,
N-vinyl-2-oxo-4-benzyl-5-hexenyleneimine,
N-vinyl-2-oxo-7-dodecyl-3-hexenyleneimine,
N-vinyl-2-oxo-3,4,5-triethyl-6-hexenyleneimine, and
N-vinyl-2-oxo-3,4,5,6-tetramethyl-6-hexenyleneimine; and
the N-vinyl-2-oxo-hexadienyleneimines such as
N-vinyl-2-oxo-3,5-hexadienyleneimine,
N-vinyl-2-oxo-4,6-hexadienyleneimine,
N-vinyl-2-oxo-3,6-hexadienyleneimine,
N-vinyl-2-oxo-4,5-diisopropyl-3,6-hexadienyleneimine, and
N-vinyl-2-oxo-3,4,5,6,7-pentamethyl-4,6-hexadienyleneimine.

A presently preferred curable liquid binder comprises a polyurethane. Any suitable polyurethane can be used to prepare the potting and bonding compositions of the invention. Presently preferred polyurethanes are those prepared by the interaction of a polyisocyanate with an active hydrogen-containing compound selected from the group consisting of aliphatic saturated and unsaturated polyhydroxy compounds and polyamino compounds containing at least one active hydrogen atom. Said polyurethane monomers are usually reacted in substantially stoichiometric amounts. However, said active hydrogen-containing compound can be used in amounts up to 15 weight percent in excess of stoichiometric and said diisocyanate can be used in amounts up to 25 weight percent in excess of stoichiometric.

While organic polyisocyanates in general can be used in the practice of this invention, the diisocyanates are preferred because of their availability and ease of preparation. Said polyisocyanates should be liquid under the conditions of use defined above. Representative polyisocyanates include, among others, the following:

benzene-1,3-diisocyanate,
benzene-1,4-diisocyanate,
hexamethylene diisocyanate,
toluene-2,4-diisocyanate;
toluene-2,5-diisocyanate,
diphenylmethane-4,4′-diisocyanate,
diphenyl-4,4′-diisocyanate,
diphenyl-3,3′-dimethyl-4,4′-diisocyanate,
2-chloropropane-1,3-diisocyanate,
diphenyl-3,3′-dimethoxy-4,4′-diisocyanate,
naphthalene-1,5-diisocyanate,
pentamethylene diisocyanate,
tetramethylenediisocyanate,
octamethylene diisocyanate,
dimethylene diisocyanate,
propylene-1,2-diisocyanate,
benzene-1,2,4-triisocyanate,
toluene-2,3-diisocyanate,
diphenyl-2,2′-diisocyanate,
naphthalene-2,7-diisocyanate,
naphthalene-1,8-diisocyanate,
toluene-2,4,6-triisocyanate,
benzene-1,3,5-triisocyanate,
benzene-1,2,3-triisocyanate, and
toluene-2,3,4-triisocyanate.

Active hydrogen-containing compounds which can be used in the practice of the invention include those which have plasticizing properties and which are known to react with polyisocyanates to form polyurethanes. Compounds which are useful for this purpose in the practice of the invention are those which contain hydroxy and/or amino groups, each of said amino groups containing at least one active hydrogen atom, and which are reactive with an isocyanate group, —NCO. Compounds employed have two or more of said reactive hydrogen-containing groups in the molecule. Commonly, the preferred compounds are glycols and hydroxy containing esters, including polyglycols and polyesters. Polyamino compounds including diamines such as putrescine and cadaverine can also be employed. Triols such as glycerol and tetrols such as erythritol can also be used. Natural products which are particularly useful include castor oil, which comprises a glyceride of ricinoleic acid, and ricinoleyl alcohol, and mixtures thereof. Said active hydrogen containing compounds should be liquid under the conditions of use defined above.

Other examples of these active hydrogen containing compounds include alkylene glycols such as ethylene glycol, diethylene glycol, tetraethylene glycol, neopentyl glycol, compounds designated as polyethylene glycol and polypropylene glycol having a molecular weight as high as 10,000 and even higher, propylene glycol, dipropylene glycol, mixed glycols such as the ethylene-propylene glycols, butylene glycol, dibutylene glycol, pentamethylene glycol, ricinoleyl alcohol, pentaerythritol [2,2-bis (hydroxymethyl)-1,3-propanediol], esters containing two or more OH groups, and the like. The esters can be made by reaction of dicarboxylic acids with glycols. Acids which can be used in the preparation of these esters include adipic, sebacic, succinic, phthalic and ricinoleic. These acids can be reacted with the above-described glycols to give esters of relatively low (e.g., 200–500) to relatively high (10,000 and even higher) molecular weight. Various methods for the preparation of these esters are known. For example, the acid and glycol can be reacted at an acid to glycol mol ratio between 0.5 and 2 under conditions to promote elimination of the water produced by the reaction. Still another method involves alternate additions of dicarboxylic acid and of glycol.

Still other examples of the active hydrogen containing compounds are ethanolamine, diethanolamine, isopropanolamine, diisopropanolamine, ethanolisopropanolamine, dibutanolamine, ethanolbutanolamine, ethylenediamine, diethylenetriamine, triethylenetetramine, tetraethylenepentamine, propylenediamine, dipropylenetriamine, hexamethylenediamine, heptamethylenediamine, 2,3 - dimethyl - 1,6 - diaminohexane, 4,6 - diethyl - 1,5,8-triaminooctane, 3,9 - dimethyl - 4,8 - diisobutyl - 1,6,11-triaminoundecane, 1,5 - diamino - 2 - pentene, 1,6 - dimethyl-1,7-diamino-4-heptene, and 2,8,7-trimethyl-1,6,10-triamino-3-decene.

If desired other plasticizers can be used in combination with the N-vinyl amides in the potting and bonding compositions of the invention. In general, any rubber plasticizer which is compatible with the above described polyurethanes can be employed in these compositions. Materials such as dioctyl sebacate; di - (1,4,7-trioxaundecyl)methane; di(3,6-dioxadecyl)formal (TP–90B) and dioctyl phthalate are suitable plasticizers. Materials which provide a rubber having good low temperature properties are preferred.

While the potting and bonding compositions of the invention will cure at ordinary room temperatures on standing it is sometimes desirable to use curing catalysts and elevated temperatures so as to alter the curing time and the properties of the cured composition. Suitable curing catalysts include, among others, metal complexes such as Ferrocene (dicyclopentadienyl iron) or 2,4-pentane dione complexes with cobalt, chromium, nickel or iron. The amount of curing catalyst used will generally range from 0 to 1 weight percent based on the total composition. The curing temperature, when elevated temperatures are used, is generally in the range between 150 and 300° F. The curing time must be long enough to give the desired mechanical properties in the finished composition. The curing time will depend upon the temperature. The curing time will generally be in the range between 15 minutes and 100 hours or longer.

As mentioned above the bonding and potting compositions of the invention can be used as the binder component in solid composite propellant compositions wherein a solid oxidizer component is dispersed in said binder component. When so used said binder component contains polyurethanes of the type hereinbefore described, together with an N-vinyl amide plasticizer of the invention, and in addition, there may be present one or more other compounding ingredients such as other plasticizers as mentioned above, wetting agent, antioxidants, and curing catalysts. The finished binder frequently contains various compounding ingredients. Thus it will be understood that herein and in the claims, unless otherwise specified, the term "binder" is employed generically and includes various conventional compounding ingredients. The binder content of the total propellant composition will usually range from 10 to 50 percent by weight.

Plasticizers employed in the binder compositions can be the same as those previously described as suitable for the potting and bonding compositions of the invention.

Wetting agents aid in deflocculating or dispersing the oxidizer, Aerosol OT (dioctyl ester of sodium sulfosuccinic acid) lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N'-diphenyl-p-phenylenediamine), phenyl-beta-naphthylamine, 2,2-methylene-bis(4-methyl-6-tert-butylphenol), and the like. Rubber antioxidants, in general, can be employed or if desired can be omitted.

While the propellant compositions of the invention will cure at ordinary room temperatures on standing, it is sometimes desirable to use curing catalysts and elevated temperatures so as to alter the curing time and the properties of the finished propellant. Suitable curing catalysts include among others, metal complexes such as Ferrocene (dicyclopentadienyl iron) or 2,4-pentane-dione complexes with cobalt, chromium, nickel, or iron. The amount of curing catalyst used will generally range from 0 to 1 weight percent based on the total propellant composition.

The curing temperature will be limited by the oxidant employed in some cases but will generally be in the range between 70 and 250° F., preferably between 140 and 200° F.

The curing time must be long enough to give required creep resistance and other mechanical properties in the propellant. The time will generally range from around two or three hours when the higher curing temperatures are employed to about seven days when curing is effected at lower temperatures.

Oxidants which are applicable in the solid propellant compositions of this invention are those oxygen-containing solids which readily give up oxygen and include, for example, ammonium, alkali metal, and alkaline earth metal salts of nitric, perchloric, and chloric acids, and mixtures thereof. Ammonium nitrate and ammonium perchlorate are the preferred oxidizers for use in the solid propellants of this invention. Other specific oxidizers include sodium nitrate, potassium perchlorate, lithium chlorate, calcium nitrate, barium perchlorate, and strontium chlorate. Mixtures of oxidizers are also applicable. In the preparation of the solid rocket propellant compositions, the oxidizers are ground to a particle size, preferably within the range between 2 and 300 microns average particle size. The most preferred particle size is from 10–220 microns. The amount of solid oxidizer used is usually a major amount of the total propellant composition and is generally in the range between 50 and 90 percent by weight of the total propellant composition. If desired, however, the oxidizer can comprise less than 50 percent by weight of the propellant composition, in some instances.

Burning rate catalysts applicable in the invention include ammonium dichromate, and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is a pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, is usually in the range of 0 to 10 weight percent based on the total propellant composition.

It is to be understood that each of the various types of compounding ingredients can be used singly, or mixtures of various ingredients performing a certain function can be employed. It is sometimes preferred, for example, to use mixtures of plasticizers rather than a single material.

The binder forms a continuous phase in the propellant with the oxidant as the discontinuous phase. One procedure for blending the propellant ingredients utilizes a stepwise addition of oxidant and other dry ingredients to the binder mixture. The binder ingredients are mixed to form a binder mixture, and the oxidizer ingredient is then added to said binder mixture in equal subsequent additions, usually four or more.

One presently preferred and convenient method of preparing the castable propellant compositions of the invention comprises blending a solid inorganic oxidizing salt with an N-vinyl amide so as to coat said salt with said amide and form a first blend. Said first blend is then blended with an active hydrogen-containing compound and the remainder of the ingredients (except the polyisocyanate) to form a second blend. Said second blend then blended with a polyisocyanate in an amount sufficient to interact with said active hydrogen-containing compound and form a polyurethane. Other variations in the mixing procedure can be introduced. In some instances all of the ingredients except the polyisocyanate can be blended in one operation and the polyisocyanate is then added. It is even possible with some polyisocyanates to incorporate them with the rest of the ingredients rather than waiting until all of the other ingredients are thoroughly blended.

If desired a highly halogenated organic compound such as Kel-F polymer oil (polytrifluorochloroethylene) can be employed as a casting aid in the propellant compositions. The use of highly halogenated organic compounds as casting aid in castable propellant compositions is disclosed and claimed in copending application Serial No. 726,295, filed April 3, 1958 by R. L. Cobb, P. S. Hudson, and L. M. Mayfield.

A general formulation for a propellant composition prepared in accordance with the invention is as follows:

| | Weight percent |
|---|---|
| Binder | 10–50 |
| Polyurethane | 10–49 |
| N-vinyl amide | 1–15 |
| Binder:—Continued | Weight percent |
| Plasticizers (other than N-vinyl amide) | 0–10 |
| Antioxidant | 0–5 |
| Surface active agent | 0–5 |
| Curing catalyst | 0–1 |
| Highly halogenated organic compound | 0–5 |
| Oxidizer | 50–90 |
| Burning rate catalyst | 0–10 |

The following examples will serve to further illustrate the invention.

EXAMPLE I

Four compositions were prepared which contained castor oil, toluene-2,4-diisocyanate (commercial grade) and variable quantities of N-vinylcaprolactam, and dioctyl sebacate. A mixture of the castor oil and N-vinylcaprolactam, and/or dioctyl sebacate was prepared first and the diisocyanate was added. The quantities of the ingredients were as follows:

| Run No. | Castor Oil, Wt. Percent | Toluene-2,4-diisocyanate, Wt. Percent | N-vinyl-caprolactam, Wt. Percent | Dioctyl Sebacate, Wt. Percent |
|---|---|---|---|---|
| 1 | 71.3 | 18.7 | 0.0 | 10.0 |
| 2 | 71.3 | 18.7 | 2.0 | 8.0 |
| 3 | 71.3 | 18.7 | 5.0 | 5.0 |
| 4 | 71.3 | 18.7 | 10.0 | 0.0 |

The compositions were placed in an oven at 180° F. and the change in viscosity was noted. Results were as follows:

Time, hours:                 Remarks
- 0.5 — No noticeable difference in viscosity.
- 1 — Viscosity slightly greater, 1>2>3>4*.
- 2 — 1 and 2 solid; 3 and 4 viscous, 3>4*.
- 3 — 3 very viscous; 4 quite fluid.
- 4 — 3 no longer flows but is very soft and tacky; 4 is a viscous fluid; 1 and 2 are firm rubbers.
- 5 — 4 still fluid.
- 6 — 4 still fluid.
- 24 — 4 still fluid.
- 50 — 4 still fluid.
- 120 — 4 very viscous; shows slight flow when hot.

*Denotes order of decreasing viscosity.

EXAMPLE II

Four compositions containing the following quantities of ingredients were prepared in the manner described in Example I:

| Run No. | Castor Oil, Wt. Percent | Toluene-2,4-diisocyanate[1], Wt. Percent | N-vinyl-caprolactam, Wt. Percent | Dioctyl Phthalate, Wt. Percent |
|---|---|---|---|---|
| 1 | 71.3 | 18.7 | 0.0 | 10.0 |
| 2 | 71.3 | 18.7 | 2.0 | 8.0 |
| 3 | 71.3 | 18.7 | 5.0 | 5.0 |
| 4 | 79.2 | 20.8 | 0.0 | 0.0 |

[1] Commercial product as in Example I.

The compositions were placed in an oven at 180° F. and the change in viscosity was noted. Results were as follows:

Time, minutes:              Remarks
- 30 — 4 more viscous than others.
- 60 — 4 was solid, viscosity noticeably increased in others, 3<2<1*.
- 80 — 1 solid, 2 more viscous than 3.
- 100 — 2 solid, 3 viscous but still flows.
- 120 — 3 viscous but still flows.
- 150 — 3 viscous but still flows.

*Denotes order of increased viscosity.

Material from Run 3 became solid after being left in the oven overnight.

EXAMPLE III

N-vinylcaprolactam, N-vinylpyrrolidone, and dioctyl phthalate were compared as plasticizers in compositions containing castor oil and toluene-2,4-diisocyanate (commercial product). A mixture of the castor oil and plasticizer was prepared first and the diisocyanate added. The quantities of ingredients used were as follows:

| Run No. | Castor Oil, Wt. Percent | Toluene-2,4-diisocyanate, Wt. Percent | N-vinylcaprolactam, Wt. Percent | N-vinylpyrrolidone, Wt. Percent | Dioctyl Phthalate, Wt. Percent |
|---|---|---|---|---|---|
| 1 | 71.3 | 18.7 | 10.0 | | |
| 2 | 71.3 | 18.7 | | 10.0 | |
| 3 | 71.3 | 18.7 | | | 10.0 |

The following exotherm data were obtained on mixing the compositions:

| Time, Minutes | Temperature, °C. Runs | | |
|---|---|---|---|
| | 1 | 2 | 3 |
| 0 | 22 | 22 | 22 |
| 1 | 23 | 24 | 23 |
| 2 | 24.2 | 26 | 24.5 |
| 3 | 25.5 | 27.5 | 26 |
| 4 | 27.0 | 29 | |
| 5 | 28.0 | 30 | 28 |
| 7 | 30.0 | 32 | 30 |
| 9 | 31.6 | 33.5 | 31.5 |
| 12 | 33.2 | 34.3 | 32.5 |
| 15 | 34.0 | 34.5 | 33 |
| 20 | 34.0 | 33.5 | 32.8 |

These data show that the initial exotherms of the samples were substantially the same, indicating that the inhibiting action of the N-vinyl compounds did not occur at once but the effect was realized at some later stage.

The compositions were then placed in an oven at 180° F. After one hour, the fluidity was in the order 1>2>3, and after 1.5 hours, sample No. 3 was solid, No. 2 was a soft gel which possessed slight flow, and No. 1 was still fluid.

EXAMPLE IV

N-vinylcaprolactam, ethylcaprolactam, caprolactam, N-vinylpyrrolidone, and butyrolactone were employed in compositions containing castor oil and toluene-2,4-diisocyanate (commercial grade). The diisocyanate was added to the previously prepared blends of castor oil and the other ingredients(s). In Run No. 4 the components were heated to dissolve the caprolactam prior to addition of the diisocyanate. The N-vinylpyrrolidone was distilled before using, boiling point 111° C. at 25 mm. Hg. The ethylcaprolactam was distilled after drying azeotropically with benzene. The quantities of ingredients in the several compositions are shown below:

| Run No. | Castor Oil, Wt. Percent | Toluene-2,4-diisocyanate, Wt. Percent | Dioctyl Phthalate, Wt. Percent | N-vinylcaprolactam, Wt. Percent | N-ethyl caprolactam, Wt. Percent | Caprolactam, Wt. Percent | N-vinylpyrrolidone, Wt. Percent | Butyrolactone, Wt. Percent |
|---|---|---|---|---|---|---|---|---|
| 1 | 71.3 | 18.7 | 10.0 | | | | | |
| 2 | 71.3 | 18.7 | | 10.0 | | | | |
| 3 | 71.3 | 18.7 | | | 10.0 | | | |
| 4 | 71.3 | 18.7 | 5.0 | | | 5.0 | | |
| 5 | 71.3 | 18.7 | | | | | 10.0 | |
| 6 | 71.3 | 18.7 | | | | | | 10.0 |

The compositions were placed in an oven at 180° F. and the fluidity was observed at intervals. Results were as follows:

Time: Fluidity
5 minutes _____ 4 solid gel, others fluid.
30 minutes _____ All fluid except 4.
1 hour _____ 5>2>6>1>3 (order of decreasing fluidity).
1.5 hours _____ 5 and 2 very fluid; 1, 3, and 6 solid (no flow).
2 hours _____ 5>2 (5 more fluid than 2).
3 hours _____ 2>5 (2 more fluid than 5) both getting viscous.
4 hours _____ 5 very viscous, 2 fluid.
5 hours _____ 5 very viscous, 2 fluid.
7 hours _____ 5 solid, 2 still flows.

Sample No. 2 was still fluid after being kept at 180° F. overnight. The above results clearly show the marked superiority of N-vinyl amides for extending the pot life.

EXAMPLE V

A linear polyester resin (designated as Multron R-16, Mobay Chemical Company), having a hydroxyl number within the range of 38–45 and an equivalent weight within the range 1240–1470, was employed in compositions containing 1,4-butanediol, toluene-2, 4-diisocyanate (commercial product), and either N-vinylcaprolactam or dioctyl phthalate, or both. All samples were mixed (diisocyanate added last) and allowed to stand at room temperature 1.5–2.5 hours. All samples were fluid after standing at room temperature. The quantities of ingredients in the several compositions were as follows:

| Run No. | Multron R-16, Wt. Percent | 1,4-Butanediol, Wt. Percent | Toluene-2,4-diisocyanate, Wt. Percent | N-vinylcaprolactam, Wt. Percent | Dioctyl Phthalate, Wt. Percent |
|---|---|---|---|---|---|
| 1 | 80.1 | 1.3 | 8.6 | 5.0 | 5.0 |
| 2 | 80.1 | 1.3 | 8.6 | | 10.0 |
| 3 | 80.1 | 1.3 | 8.6 | 10.0 | |
| 4 | 71.2 | 1.1 | 7.7 | 5.0 | 15.0 |
| 5 | 71.2 | 1.1 | 7.7 | | 20.0 |

The compositions were placed in an oven at 180° F. for 3 hours. At the end of this period all samples were fluid but the viscosity had increased with heating. Samples 4 and 5 had a small layer of colorless liquid on top which indicated incompatibility of the plasticizer. All samples were removed from the oven and allowed to stand overnight at room temperature. The viscosity increased during this overnight period. Heating was resumed and after one hour at 180° F. (total of 4 hours heating at 180° F.) the fluidities were determined. They were found to be in the order 3>1>2. Samples 4 and 5 were quite viscous. Heating at 180° F. was then continued. After a total of 6 hours of heating, the viscosity had increased further with sample 3 still being more fluid than 1 and 2. All samples were placed in an oven at 125° C. (257° F.) and cured for six days. The following observations were made at the end of this curing period:

No. 1 was a soft and easily cut rubber.

No. 2 was firmer than No. 1 but was not rubbery. It was easily cut.

No. 3 was a rubber with good tensile strength and tear resistance. It was found that the sample formed a strong bond with the glass vial in which it was heated.

Nos. 4 and 5 had relatively low tensile strength.

EXAMPLE VI

Hexamethylene diisocyanate (1.34 grams) was added to a mixture containing 5.62 grams of castor oil and 0.50 gram of N-vinylcaprolactam (6.7 weight percent based on the total composition). The composition was heated at 180° F. It was a viscous fluid after 5.5 hours but after curing overnight at the same temperature, it was a firm, soft rubber.

Two other compositions, containing ingredients as shown below, were prepared in a similar manner:

|  | Grams | |
| --- | --- | --- |
|  | 1 | 2 |
| Castor oil | 2.81 | 1.22 |
| Polypropylene glycol [1] |  | 1.66 |
| Hexamethylene diisocyanate | 0.67 | 0.60 |
| tert-Butyl perbenzoate | 0.01 | 0.02 |
| N-vinylcaprolactam | [2] 1.50 | [2] 1.50 |

[1] Commercial product, molecular weight about 1025.
[2] 30 weight percent based on total composition.

Both samples were heated at 180° F. for about 64 hours. They were still liquid after this treatment. An additional 0.04 gram of tert-butyl perbenzoate was added to each composition and heating was continued overnight. Both compositions were still fluid, indicating that an excessive quantity of plasticizer was present.

EXAMPLE VII

Two compositions containing the following ingredients were prepared, the toluene-2,4-diisocyanate being added last in each case:

|  | Grams | |
| --- | --- | --- |
|  | 1 | 2 |
| Polypropylene glycol [1] | 2.55 | 2.55 |
| Triethylene glycol | 0.44 | 0.44 |
| Triisopropanolamine | 0.28 | 0.28 |
| Toluene-2,4-diisocyanate [2] | 1.23 | 1.23 |
| N-vinylcaprolactam | 0.50 |  |
| Dioctyl phthalate |  | 0.50 |

[1] Commercial product, molecular weight about 2025.
[2] Commercial product.

The compositions were placed in an oven at 180° F. Both turned opaque after 30 minutes and after 45 minutes No. 2 had become more viscous than No. 1. After one hour No. 2 did not flow except for a thin layer on the surface which indicated incompatibility of the plasticizer. No. 1 did not flow after 3 hours. Both samples were firm rubbers after being cured for about 64 hours at 180° F. but No. 1 had somewhat better strength than No. 2.

EXAMPLE VIII

A linear polyester resin (designated as Plaskon PFR-4 resin, Allied Chemical and Dye Corporation), having a hydroxyl number within the range of 55–62, an acid number within the range of 1–2, and a Brookfield viscosity at 25° C. within the range of 8,000–10,000 cps., was employed in two compositions with toluene-2,4-diisocyanate (commercial product), using a plasticizer either N-vinylcaprolactam or dioctyl phthalate. The compositions contained the following quantities of ingredients:

| Run No. | Weight, Grams | | | |
| --- | --- | --- | --- | --- |
|  | Plaskon PFR-4 | Toluene-2,4-diisocyanate | N-vinyl-caprolactam | Dioctyl Phthalate |
| 1 | 3.30 | 1.20 | 0.5 |  |
| 2 | 3.30 | 1.20 |  | 0.50 |

The compositions were mixed, the diisocyanate being added last, and then placed in an oven at 180° F. The mixture was agitated when hot to insure intimate blending of the ingredients. Both compositions were still fluid after being heated at 180° F. for 11 hours, but after curing at this temperature for a total of 5 days, No. 1 was a strong, firm rubber while No. 2 was a rubber with low modulus and the plasticizer appeared incompatible with the resin.

EXAMPLE IX

A castable propellant composition contained the following ingredients:

| Liquid binder: | Weight percent |
| --- | --- |
| Castor oil | 8.94 |
| Flexricin 15 [1] | 4.62 |
| Nacconate 65 [2] | 4.50 |
| N-vinylcaprolactam | 0.94 |
| Kel-F polymer oil [3] | 1.00 |
| Ammonium perchlorate [4] | 80.00 |
|  | 100.00 |

[1] 2-hydroxyethyl ricinoleate.
[2] A mixture of toluene-2,4- and toluene-2,6-diisocyanate in a 65/35 weight ratio.
[3] Poly-trifluoromonochloroethylene.
[4] A 56/24 product, the ratio designating the large to small particle size material. Large particle size, 210 microns; small particle size, 14–18 microns.

The N-vinylcaprolactam and Kel-F polymer oil were mixed with the ammonium perchlorate for 15 minutes. The other ingredients except the diisocyanate were added and mixing was continued for 45 minutes. The diisocyanate was added and the material was mixed under vacuum for 10 minutes after which it was poured into a mold and vibrated by means of an air vibrator for one hour to effect settling and prevent formation of voids. All mixing was done in a Baker-Perkins mixer. The cast composition was allowed to stand at room temperature and was observed at intervals. It remained fluid more than two hours after casting.

A propellant composition similar to the preceding one was prepared except that it contained no N-vinylcaprolactam. It contained the following ingredients:

| Liquid binder: | Weight percent |
| --- | --- |
| Castor oil | 7.18 |
| Flexricin 15 | 7.01 |
| Toluene-2,4-diisocyanate | 4.81 |
| Kel-F polymer oil | 1.00 |
| Ammonium perchlorate, 40/20/20 [1] | 80.00 |
|  | 100.00 |

[1] Ratio denotes relative amounts of different particle size material as follows:

| 40 parts | 210 microns |
| --- | --- |
| 20 parts | 90 microns |
| 20 parts | 35 microns |

All ingredients except the toluene-2,4-diisocyanate were mixed in a Baker-Perkins mixer for 45 minutes, the diisocyanate was added, and the material was mixed under vacuum for 10 minutes. It was poured into a mold and vibrated as above. Approximately one hour after being cast, the composition had solidified.

Examples of other uses of the potting and bonding compositions of the invention can best be shown by referring to the attached drawings.

Referring to FIGURE 1, a solid propellant fuel 10 is centered inside metal case 11. A liquid blend 12 such as prepared in Run No. 3 of Example V is then poured into the annular space between the fuel and the case. The composition is then cured at a somewhat elevated temperature thereby forming an integrated assembly. Those skilled in the art will see many applications of this method of sealing a solid in a casing.

Referring to FIGURES 2a and 2b, plates 13 and 14 are first coated with a layer of a composition 16 prepared in accordance with the invention after which they are brought together under pressure and the composition cured. This method is applicable for preparing laminated structures and can be used for bonding a plurality of plates together.

Referring to FIGURE 3, a metal device 17 is dipped into a composition 18 prepared in accordance with the invention. As the device is withdrawn, a thin film 19 clings to the device. This film can then be cured forming a permanent coating on the device.

Referring to FIGURES 4 and 5, a transformer 21 is lowered into case 22. The case is sealed and evacuated. The potting compound 23 is then admitted under vacuum filling the evacuated assembly. This method avoids air bubbles and insures completely filling the case. However, other potting methods can be used, for example, pouring the potting compound around the assembly.

I claim:

1. A process for potting a solid component within a casing, which process comprises: lowering said component into a case; sealing said case; evacuating the sealed case; injecting a fluid potting and bonding composition into said case; and curing the thus-prepared assembly for a period of time sufficient to cause said composition to set to a firm flexible mass; said potting and bonding composition comprising: an active hydrogen containing compound selected from the group consisting of polyhydroxy compounds and polyamino compounds containing at least two active hydrogen atoms; a polyisocyanate; said polyisocyanate being present in an amount ranging from about stoichiometric to about 25 weight percent in excess of the stoichiometric quantity which will react with said active hydrogen containing compound and said active hydrogen containing compound being present in an amount ranging from about stoichiometric to about 15 weight percent in excess of the stoichiometric quantity which will react with said polyisocyanate; and from 1 to 15 weight percent of an N-vinyl amide characterized by a structural formula selected from the group of formulas consisting of

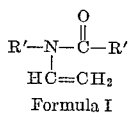

Formula I and

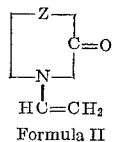

Formula II wherein: each R' is selected from the group consisting of alkyl, cycloalkyl, aryl, alkaryl, and aralkyl hydrocarbon groups containing from 1 to 16 carbon atoms; Z is selected from the group consisting of saturated, monoolefinic, and diolefinic divalent hydrocarbon radicals containing from 3 to 17 carbon atoms which, together with the N atom and the C atom connected thereto, form a 5 to 7 membered ring; and wherein the total number of carbon atoms in the molecule does not exceed 20.

2. The process of claim 1 wherein the solid component is an electronic assembly, and said thus-prepared assembly is cured at a temperature within the range of 150 to 300° F.

3. A process for producing an integrated assembly from a plurality of solid components, which process comprises: contacting a plurality of surfaces with a fluid potting and bonding composition; bringing the resulting coated surfaces into close proximity one with another; and curing the resulting assembly for a period of time sufficient to cause said composition to set to a firm flexible mass; said potting and bonding composition comprising: an active hydrogen containing compound selected from the group consisting of polyhydroxy compounds and polyamino compounds containing at least two active hydrogen atoms; a polyisocyanate; said polyisocyanate being present in an amount ranging from about stoichiometric to about 25 weight percent in excess of the stoichiometric quantity which will react with said active hydrogen containing compound and said active hydrogen containing compound being present in an amount ranging from about stoichiometric to about 15 weight percent in excess of the stoichiometric quantity which will react with said polyisocyanate; and from 1 to 15 weight percent of an N-vinyl amide characterized by a structural formula selected from the group of formulas consisting of

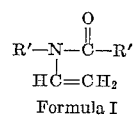

Formula I and

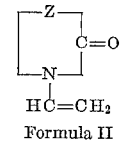

Formula II wherein: each R' is selected from the group consisting of alkyl, cycloalkyl, aryl, alkaryl, and aralkyl hydrocarbon groups containing from 1 to 16 carbon atoms; Z is selected from the group consisting of saturated, monoolefinic, and diolefinic divalent hydrocarbon radicals containing from 3 to 17 carbon atoms which, together with the N atom and the C atom connected thereto, form a 5 to 7 membered ring; and wherein the total number of carbon atoms in the molecule does not exceed 20.

4. A process for bonding solid components to each other, which process comprises: filling the interspace between two closely spaced surfaces of said components with a fluid potting and bonding composition; and curing the resulting assembly for a period of time sufficient to cause said composition to set to a firm flexible mass; said potting and bonding composition comprising: an active hydrogen containing compound selected from the group consisting of polyhydroxy compounds and polyamino compounds containing at least two active hydrogen atoms; a polyisocyanate; said polyisocyanate being present in an amount ranging from about stoichiometric to about 25 weight percent in excess of the stoichiometric quantity which will react with said active hydrogen containing compound and said active hydrogen containing compound being present in an amount ranging from about stoichiometric to about 15 weight percent in excess of the stoichiometric quantity which will react with said polyisocyanate; and from 1 to 15 weight percent of an N-vinyl amide characterized by a structural formula selected from the group of formulas consisting of

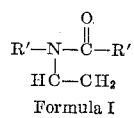

Formula I and

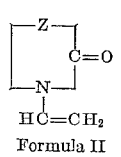

Formula II wherein: each R' is selected from the group consisting of alkyl, cycloalkyl, aryl, alkaryl, and aralkyl hydrocarbon groups containing from 1 to 16 carbon atoms; Z is selected from the group consisting of saturated, monoolefinic, and diolefinic divalent hydrocarbon radicals containing from 3 to 17 carbon atoms which, together with the N atom and the C atom connected thereto, form a 5 to 7 membered ring; and wherein the total number of carbon atoms in the molecule does not exceed 20.

5. A process for producing a coating on solid devices, which process comprises: dipping the device into a fluid potting and bonding composition; withdrawing said device and thereby leaving a film of said composition thereon; and curing said withdrawn device for a period of time sufficient to cause said film to set to a firm flexible mass; said potting and bonding composition comprising: an active hydrogen containing compound selected from the group consisting of polyhydroxy compounds and polyamino compounds containing at least two active hydrogen atoms; a polyisocyanate; said polyisocyanate being present in an amount ranging from about stoichiometric to about 25 weight percent in excess of the stoichiometric quantity which will react with said active hydrogen containing compound and said active hydrogen containing compound being present in an amount ranging from about stoichiometric to about 15 weight percent in excess of the stoichiometric quantity which will react with said polyisocyanate; and from 1 to 15 weight percent of an N-vinyl amide characterized by a structural formula selected from the group of formulas consisting of

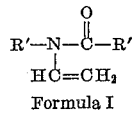

Formula I and

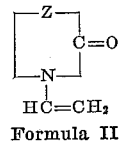

Formula II wherein: each R' is selected from the group consisting of alkyl, cycloalkyl, aryl, alkaryl, and aralkyl hydrocarbon groups containing from 1 to 16 carbon atoms; Z is selected from the group consisting of saturated, monoolefinic, and diolefinic divalent hydrocarbon radicals containing from 3 to 17 carbon atoms which, together with the N atom and the C atom connected thereto, form a 5 to 7 membered ring; and wherein the total number of carbon atoms in the molecule does not exceed 20.

References Cited by the Examiner

UNITED STATES PATENTS

| | | | |
|---|---|---|---|
| 1,424,738 | 8/22 | Redman et al. | 18—59 |
| 2,193,513 | 5/38 | Hempel et al. | 18—59 |
| 2,414,525 | 1/47 | Hill et al. | 18—59 |
| 2,454,056 | 11/48 | Greger | 106—287 |
| 2,479,470 | 8/49 | Carr | 52—0.5 |
| 2,505,931 | 5/50 | Aelony | 106—287 |
| 2,713,700 | 7/55 | Fisher | 18—59 |
| 2,783,138 | 2/57 | Parsons | 52—0.5 |
| 2,795,505 | 6/57 | Finck et al. | 106—38.6 |
| 3,025,257 | 3/62 | Coler et al. | 260—32.6 |

ROBERT F. WHITE, *Primary Examiner.*

LEON D. ROSDOL, ROGER L. CAMPBELL,
*Examiners.*